US009472849B2

(12) United States Patent
Shin et al.

(10) Patent No.: US 9,472,849 B2
(45) Date of Patent: Oct. 18, 2016

(54) WIDEBAND RECTENNA AND RECTIFYING APPARATUS FOR RECTENNA

(71) Applicant: AGENCY FOR DEFENSE DEVELOPMENT, Daejeon (KR)

(72) Inventors: Jin Woo Shin, Daejeon (KR); Jun Ho Choi, Daejeon (KR); Joon Ho So, Daegu (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 14/645,479

(22) Filed: Mar. 12, 2015

(65) Prior Publication Data

US 2016/0094091 A1   Mar. 31, 2016

(30) Foreign Application Priority Data

Sep. 25, 2014   (KR) .................. 10-2014-0128530

(51) Int. Cl.
*H01Q 1/24* (2006.01)
*H01Q 9/04* (2006.01)
*H02J 17/00* (2006.01)

(52) U.S. Cl.
CPC ............. *H01Q 9/0407* (2013.01); *H02J 17/00* (2013.01); *H01Q 1/248* (2013.01); *H02J 50/27* (2016.02)

(58) Field of Classification Search
None
See application file for complete search history.

(56) References Cited

U.S. PATENT DOCUMENTS 6,331,257 B1 * 12/2001 Loo .................... B81B 3/0072
216/13

FOREIGN PATENT DOCUMENTS

KR   10/2008/0105398 A   12/2008

OTHER PUBLICATIONS

Ladan, S.; Hemour, S.; Wu, K., "Towards millimeter-wave high-efficiency rectification for wireless energy harvesting," in Wireless Symposium (IWS), 2013 IEEE International , vol., No., pp. 1-4, Apr. 14-18, 2013, <http://ieeexplore.ieee.org/stamp/stamp.jsp?tp=&arnumber=6616819&isnumber=6616692>.*

Akkermans, J.A.G.; van Beurden, M.C.; Doodeman, G.J.N.; Visser, H.J., "Analytical models for low-power rectenna design," in Antennas and Wireless Propagation Letters, IEEE , vol. 4, No., pp. 187-190, Jun. 20, 2005, <http://ieeexplore.ieee.org/stamp/stamp.jsp?tp=&arnumber=1435362&isnumber=30362>.*

J. Shin, M. Seo, J. Choi, J. So, and C. Cheon, "A compact and wideband circularly polarized rectenna with high efficiency at x-band," Progress in Electromagnetics Research, vol. 145, 163-173, Mar. 14, 2014, <http://www.jpier.org/pier/pier.php-?paper=14012803>.*

(Continued)

*Primary Examiner* — Rexford Barnie
*Assistant Examiner* — David Shiao
(74) *Attorney, Agent, or Firm* — Scully Scott Murphy and Presser

(57) ABSTRACT

A rectenna according to the present invention includes a circular-polarized patch antenna having dual slots fed by a microstrip and configured to receive and output a radio frequency (RF) signal, and a rectifying circuit configured to convert for output the RF signal, received by the circular-polarized patch antenna, into a direct current (DC) signal and transfer the DC signal from the antenna to a load, wherein the rectifying circuit comprises at least one radial stub.

10 Claims, 14 Drawing Sheets

(56) References Cited

OTHER PUBLICATIONS

Mei-Juan Nie; Xue-Xia Yang; Guan-Nan Tan, "A broad band rectifier with wide input power range for electromagnetic energy harvesting," in Antennas and Propagation (APCAP), 2014 3rd Asia-Pacific Conference on , vol., No., pp. 1187-1189, Jul. 26-29, 2014, <http://ieeexplore.ieee.org/stamp/stamp.jsp?tp=&arnumber=6992726&isnumber=6992393>.*

Ye-Qing Wang; Xue-Xia Yang, "Design of a High-Efficiency Circularly Polarized Rectenna for 35 GHz Microwave Power Transmission System," in Power and Energy Engineering Conference (APPEEC), 2012 Asia-Pacific , vol., No., pp. 1-4, Mar. 27-29, 2012, <http://ieeexplore.ieee.org/stamp/stamp.jsp?tp=&arnumber=6306907&isnumber=6306868>.*

Takacs, A.; Aubert, H.; Fredon, S.; Despoisse, L.; Blondeaux, H., "Microwave Power Harvesting for Satellite Health Monitoring," in Microwave Theory and Techniques, IEEE Transactions on , vol. 62, No. 4, pp. 1090-1098, Apr. 2, 2014, <http://ieeexplore.ieee.org/stamp/stamp.jsp?tp=&arnumber=6737296&isnumber=6782344>.*

Dehbashi, R. et al. "A Novel Miniaturized Broad Band-Stop Resonator Used in Rectennas in WiMAX Frequency Band" IEEE 853-856 (2006).

Yo T. et al., "Compact Circularly Polarized Rectenna With Unbalanced Circular Slots" IEEE Transactions on Antennas and Propagation 56(3):882-886 (2008).

* cited by examiner

WIDEBAND RECTENNA AND RECTIFYING APPARATUS FOR RECTENNA

CROSS-REFERENCE TO RELATED APPLICATION

Pursuant to 35 U.S.C. §119(a), this application claims the benefit of earlier filing date and right of priority to Korean Application No. 10-2014-0128530, filed on Sep. 25, 2014, the contents of which is incorporated by reference herein in its entirety.

BACKGROUND OF THE DISCLOSURE

1. Field of the Disclosure

This specification relates to a rectenna, and more particularly, a wideband rectenna.

2. Background of the Disclosure

A rectenna, which converts radio frequency (RF) energy to direct-current (DC) power, is a key component of free-space microwave power transmission (MPT) systems for the application of microwave powered unmanned aerial vehicle (UAVs), space solar power satellite stations (SSPS) and the like. The constraints on the design of MPT systems are the choice of an operating frequency and a system configuration of a transmitter and a receiver.

Recently, an MPT consisting of an active phased array, a rectenna array system, and a beam controlled system was tested and found to have RF to DC conversion efficiency ($\eta_{RF-DC}$) of 54% at 1 mW RF input for the unit element and 5.8 GHz. This system, which operates for more than 8 hours, has transmitting and receiving array elements with circular polarization, allowing it to obtain high RF-DC conversion efficiency.

In order to design a compact rectenna array, a high operating frequency should be chosen to reduce an area of a receiving array aperture. For this reason, there have been some attempts to design rectennas at 35 GHz and 95 GHz. However, there are limitations such as low RF-DC conversion efficiency and high fabricating costs to develop such high power transmitting and receiving systems.

Therefore, there have been tradeoffs with a compact size and a light weight in terms of choosing an operating frequency for microwave powered aerial vehicle (MPAV) systems, which operate at X-band.

SUMMARY OF THE DISCLOSURE

Therefore, to obviate the aforementioned drawbacks, an aspect of the detailed description is to provide a wideband rectenna providing high RF-DC conversion efficiency while operating at a wideband, and a rectifying apparatus for rectenna.

Another aspect of the detailed description is to provide a wideband rectenna for realizing a transmitting and receiving system with a compact size and a light weight, and a rectifying apparatus for rectenna.

To achieve these and other advantages and in accordance with the purpose of this specification, as embodied and broadly described herein, there is provided a rectenna including a circular-polarized patch antenna having dual slots fed by a microstrip and configured to receive and output a radio frequency (RF) signal, and a rectifying circuit configured to convert for output the RF signal, received by the circular-polarized patch antenna, into a direct current (DC) signal and transfer the DC signal from the antenna to a load, wherein the rectifying circuit comprises at least one radial stub.

The radial stub may include a first radial stub used for rejecting harmonics of the RF signal, a second radial stub used for impedance matching between the antenna and a rectifying diode, a third radial stub used for the DC power transfer, and a fourth radial stub used for lowering an RF ripple voltage to stably supply the DC power to the load.

The first radial stub may operate as a band-stop filter.

The circular-polarized patch antenna may include a first patch substrate with a first patch disposed thereon, a second patch substrate with a second patch disposed thereon, a foam substrate disposed between the first patch substrate and the second patch substrate, and a feed line substrate attached to a lower portion of the second patch.

The feed line substrate may include H-shaped dual slots, T-shaped feed lines configured to feed the H-shaped dual slots, and a power divider configured to divide power to the feed lines.

The rectifying circuit may include a harmonic rejecting unit having coupled microstrip lines and a first radial stub and configured to prevent re-radiation of RF harmonics, a matching unit located at an output of the harmonic rejecting unit, having a second radial stub, and configured to perform impedance matching between the antenna and a rectifying diode, a rectifying diode located at an output of the matching unit, a direct current (DC)-pass filter having a third radial stub and configured to attenuate RF output by the rectifying diode to transfer DC power, and a DC return unit having a fourth radial stub and configured to lower a ripple voltage from a signal output by the DC-pass filter so as to supply the DC power stably to the load.

The harmonic rejecting unit may block noise signals introduced from the antenna.

The coupled microstrip lines each may operate as a band-pass filter.

The radial stub may have an angle of circumference of 70°.

The rectifying circuit may have an operating frequency near 9.5 GHz.

Also, the present invention provides a rectifying apparatus, including a harmonic rejecting unit having coupled microstrip lines and a first radial stub and configured to prevent re-radiation of radio frequency (RF) harmonics, a matching unit located at an output of the harmonic rejecting unit, having a second radial stub, and configured to perform impedance matching between an antenna and a rectifying diode, a rectifying diode located at an output of the matching unit, a direct current (DC)-pass filter having a third radial stub and configured to attenuate RF output by the rectifying diode to transfer DC power, and a DC return unit having a fourth radial stub and configured to lower a ripple voltage from a signal output by the DC-pass filter so as to supply the DC power stably to a load.

The first radial stub may be an open-circuited radial stub and operate as a band-stop filter.

The second radial stub may include two radial stubs symmetric to each other.

The third radial stub may include a single radial stub, and a pair of radial stubs symmetric to each other.

The fourth radial stub may include a signal radial stub.

The harmonic rejecting unit may block noise signals introduced from the antenna.

The coupled microstrip lines each may operate as a band-pass filter.

The first radial stub may operate as a band-stop filter.

The first to fourth radial stubs each may have an angle of circumference of 70°.

The rectifying apparatus may have an operating frequency near 9.5 GHz.

A rectenna and a rectifying apparatus for rectenna according to the present invention can provide high RF-DC conversion efficiency while operating at a wideband.

Also, the use of the rectifying apparatus and the rectenna according to the present invention may allow for implementing a compact system.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1:
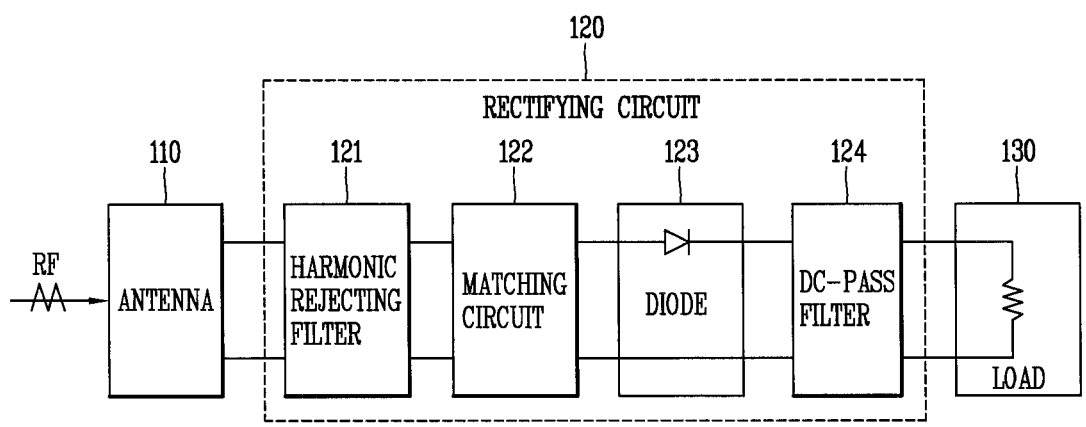
FIG. 1 is a configuration view of a general rectenna.

The present invention may be varied by various ways and have various embodiments, and specific embodiments will be illustrated in the accompanying drawings and described in detail.

However, this is not to limit the present invention to the specific embodiments, and it should be understood that the present invention includes all the variations, equivalents and replacements belonging to the scope and technical range of the present invention.

The terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention. The term "and/or" includes any and all combinations of one or more of the associated listed items.

It will be understood that when an element is referred to as being "connected with" another element, the element can be connected with the other element or intervening elements may also be present. In contrast, when an element is referred to as being "directly connected with" another element, there are no intervening elements present.

Terms used herein are merely intended to explain specific embodiments, and it should not be understood as limiting the present invention. A singular representation may include a plural representation unless it represents a definitely different meaning from the context. Terms such as "include" or "has" are used herein and should be understood that they are intended to indicate an existence of several characteristics, numbers, steps, operations, components, or combinations thereof, disclosed in the specification, and it is also understood that greater or fewer characteristics, numbers, steps, operations, components, or combinations thereof may likewise be utilized.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Hereinafter, description will be given of the preferred embodiments disclosed herein in more detail with reference to the accompanying drawings. In describing the present invention, in order to help understanding of the present invention, the same component on the drawings are designated by the same reference numeral, and repetitive description of the same component will be omitted.

FIG. 1 is a configuration view of a general rectenna.

As illustrated in FIG. 1, a general rectenna may include an antenna 110, and a rectifying circuit 120. A load 130 may be connected to the rectenna, more particularly, to an output of the rectifying circuit 120.

The rectifying circuit 120 may include a harmonic rejecting filter 121, a matching circuit 122, a diode 123 and a direct-current (DC) pass filter 124.

Here, the non-linear characteristic of the diode 123 may generate unwanted harmonic signals that propagate backward to the antenna 110 and forward to the load 130. Therefore, the harmonic rejecting filter 121, the DC-pass filter 124 and the matching circuit 122 should be carefully designed to obtain an optimized RF-DC conversion efficiency ($\eta_{RF-DC}$).

Hereinafter, description will be given of a patch antenna structure according to the present invention.

Figure 2A:
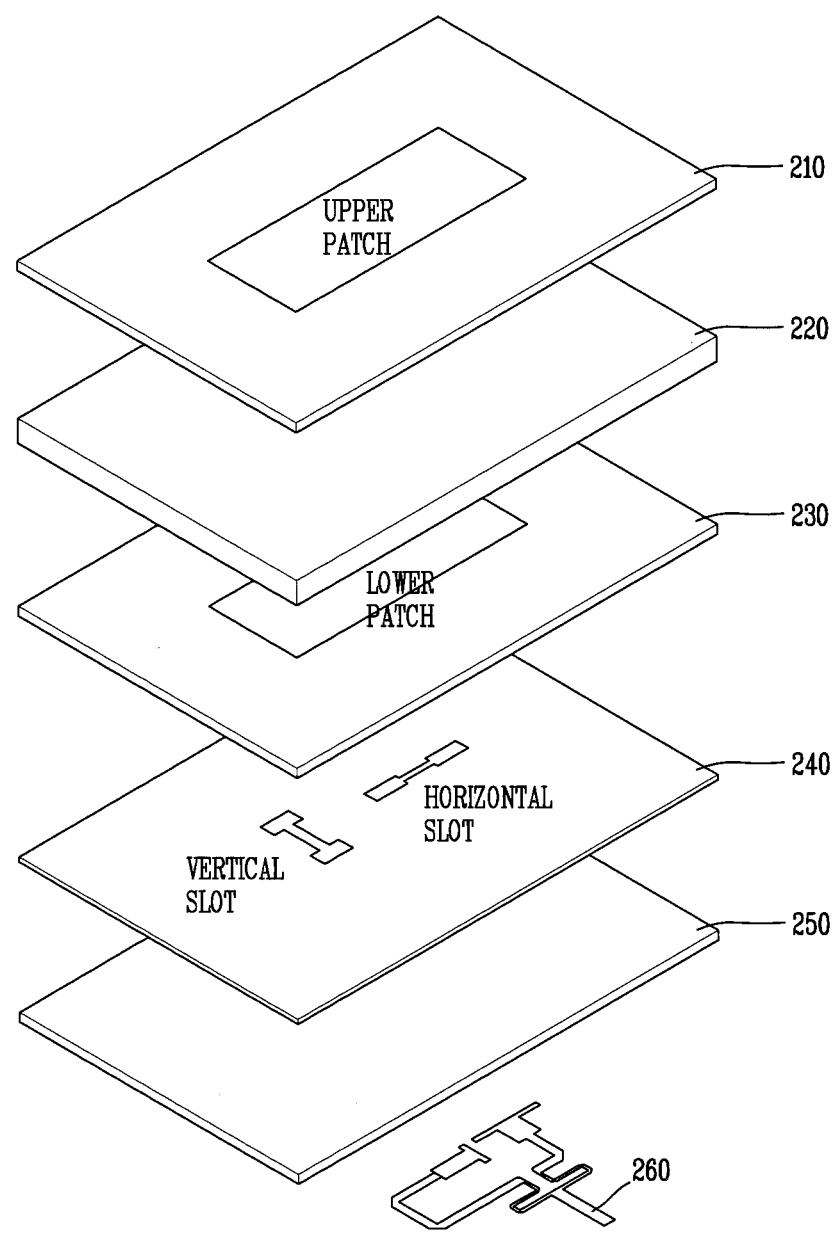
FIG. 2A is a disassembled perspective view of a wideband circularly-polarized patch antenna in accordance with one embodiment disclosed herein.

FIG. 2A is a disassembled perspective view of a wideband circularly-polarized patch antenna in accordance with one embodiment disclosed herein.

FIG. 2A illustrates an antenna element which has a resonance cavity resulting from first and second patch substrates 210 and 230 having two layered square patches, and foam disposed between the substrates 210 and 230.

Also, a substrate 240 having a vertical slot and a horizontal slot may be disposed between the second patch substrate 230 and a feed line substrate 250. The vertical slot and the horizontal slot provide orthogonal excitation to the cavity.

Circular polarization is obtained by a Wilkinson power divider and a delay line with a 90-degree phase difference between dual slots.

That is, the patch antenna can be designed to obtain broadband and circular-polarization characteristics using H-shaped slots and T-shaped feed lines that are stacked in a multi-layer substrate structure.

As illustrated in FIG. 2A, the patch antenna according to the one embodiment disclosed herein may be configured in a manner that the feed line substrate 250 for a feed line 260 is 0.38 mm thick, the substrate 230 for a lower patch is 0.64 mm thick, the substrate 220 for foam is 0.1 mm thick, and the substrate 210 for an upper patch is 0.25 mm thick.

Also, relative dielectric constants ($\in_r$) of the substrate 250 for the feed line, the substrate 230 for the lower patch, the substrate for the foam and the substrate 210 for the upper patch may be 3.5, 2.17, 1.02, and 2.17, respectively.

Here, the substrates for the dual patches and the foam may be implemented with the low relative dielectric constants so as to obtain maximum radiation efficiency and wide bandwidth, while the feed line substrate may be implemented with the relatively higher relative dielectric constant than those of the substrates for the dual patches and the foam so as to improve maximum feed efficiency.

The resonance frequency of the cavity is mainly determined by a side length of a square patch. Sizes of the upper patch and the lower patch can be designed to have a small difference in order to obtain the wideband characteristics of the antenna element.

For example, the lengths of the upper square patch and the lower square patch may be 9.64 mm and 8.51 mm, respectively.

Figure 2B:
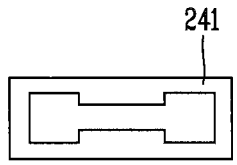
FIG. 2B(a) to 2B(d) are views illustrating feeding circuits of an antenna in accordance with one embodiment disclosed herein.
Figure 2B:
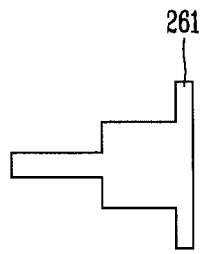
Figure 2B:
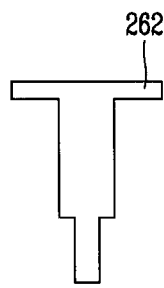
Figure 2B:
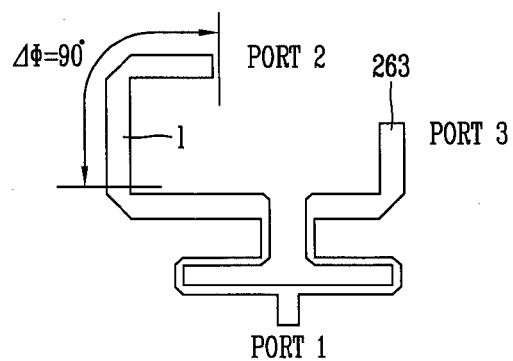

FIG. 2B(a) to 2B(d) are views illustrating feeding circuits of an antenna in accordance with one embodiment disclosed herein.

In detail, FIG. 2B(a) illustrates an H-shaped slot 241 used for a wideband circular-polarized patch antenna, FIG. 2B(b) and FIG. 2B(c) illustrate T-shaped feed lines 261 and 262, and FIG. 2B(d) illustrates a power divider 263. Optimized geometrical parameters are illustrated in FIG. 2B(a) to FIG. 2B(d).

Here, a T-shaped microstrip open stub may be electrically connected to ports 2 and 3 of the power divider 263 illustrated in FIG. 2B(d), respectively. The T-shaped feed line may be designed to occupy a smaller space than the general microstrip open stub with a length of λ/4. These stubs feed the H-shaped dual slots 241.

The power divider 263 may include a delay line 1 which extends more along one of the port 2 or the port 3 to be longer than the other, in order to create a 90-degree phase difference between the port 2 and the port 3.

Each port of the power divider 263 disclosed herein preferably has characteristic impedance of 65Ω instead of 50Ω, in order to provide an enough array spacing by reducing a width of the divider 263 having higher impedance.

Figure 2C:
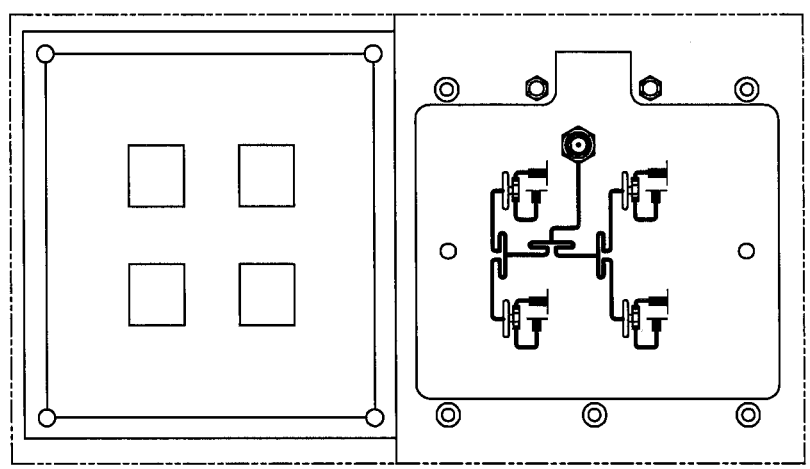
FIG. 2C is a view illustrating a fabricated four-element patch array structure in accordance with one embodiment disclosed herein.

FIG. 2C is a view illustrating a fabricated four-element patch array structure in accordance with one embodiment disclosed herein.

As illustrated in FIG. 2C, an actually-fabricated four-element patch array preferably has an element spacing of 0.8λ. Here, λ is preferably the wavelength at 9.5 GHz.

The patch array structure of FIG. 2C may have a Wilkinson power divider to feed the four patches. A patch cavity and a microstrip feed circuit are isolated by a conductor plane having the H-shaped slots, which may result in the merit of easy fabrication of a rectifier circuit on a feeding circuit layer for a large rectenna array.

FIG. 3 is a graph showing simulation results of a four-element array antenna in accordance with one embodiment disclosed herein.

Figure 3A:
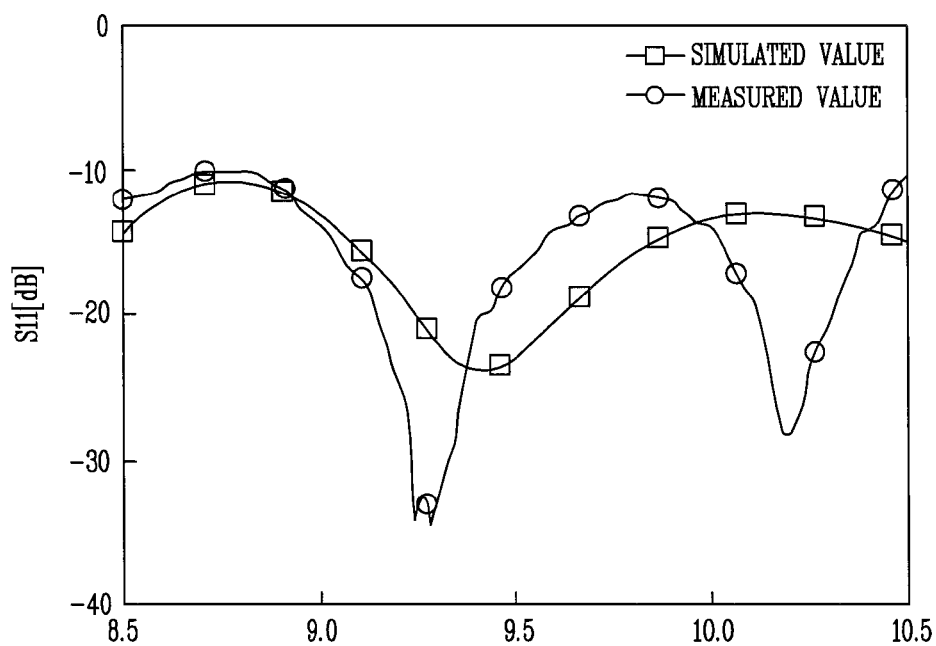
FIGS. 3A and 3B are graphs showing simulation results of a four-element array antenna in accordance with one embodiment disclosed herein.

In FIG. 3A, simulated and measured reflection coefficients for the four-element array antenna are indicated with $S_{11}$ with respect to a frequency.

The measured $S_{11}$ has the lowest value at around 9.5 GHz, and a wideband characteristic in the range from −10 dB over 2 GHz, which is similar to the wideband characteristic of the simulated $S_{11}$.

The measured lowest value is −34 dB at 9.3 GHz.

Figure 3B:
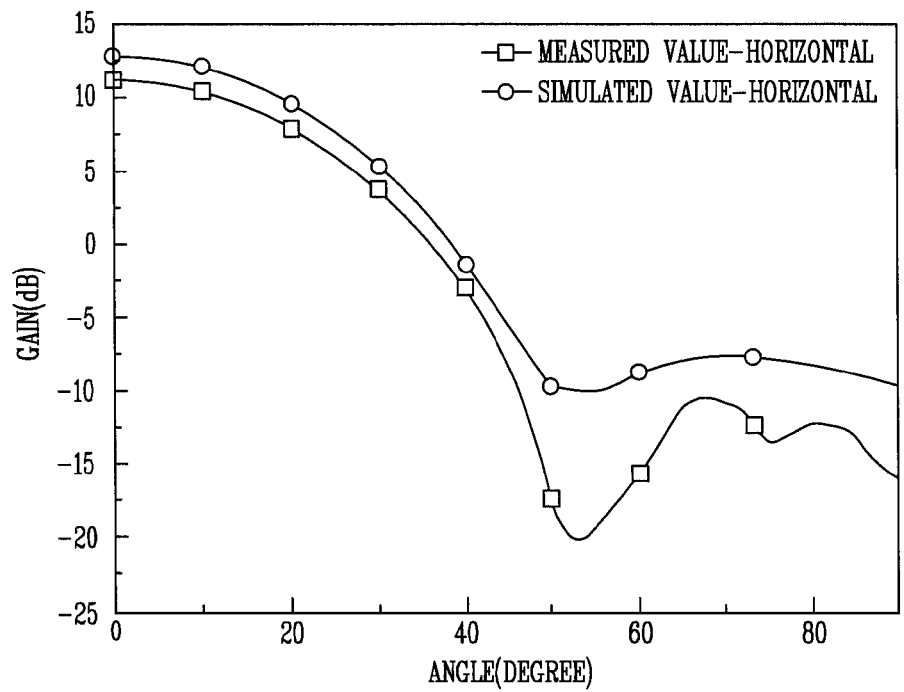

FIG. 3B is a graph showing gains of a fabricated four-element array antenna in accordance with one embodiment of the present invention.

The graph of FIG. 3B shows simulated and measured gains of the four-element array antenna at 9.5 GHz.

FIG. 3B shows horizontal radiation characteristics of the gains. Because the patch array is symmetric, vertical characteristics are similar to the horizontal characteristics.

Meanwhile, it can be noticed that the measured gain of the four-element array antenna is in a good agreement with the simulated gain. The measured and simulated gains are 11.2 dBi and 12.7 dBi, respectively.

It can also be understood that a circular-polarization (CP) characteristic of the four-element array antenna is measured in an axial ratio of 1.1 dB at a boresight angle of the antenna.

Figure 4A:
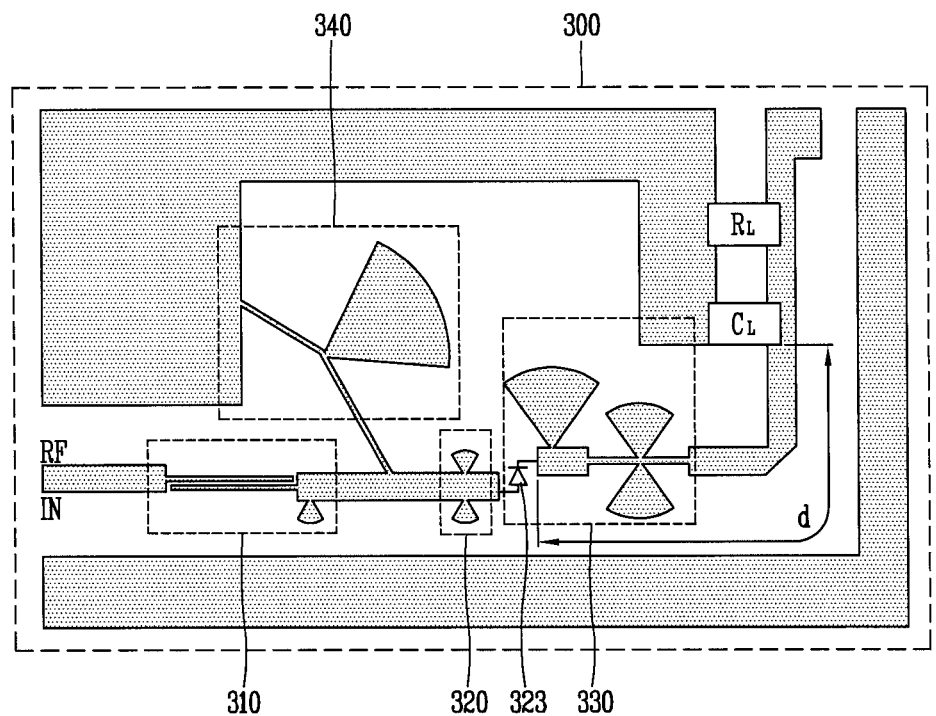
FIG. 4A is a configuration view of a rectifying circuit in accordance with one embodiment disclosed herein.
Figure 4B:
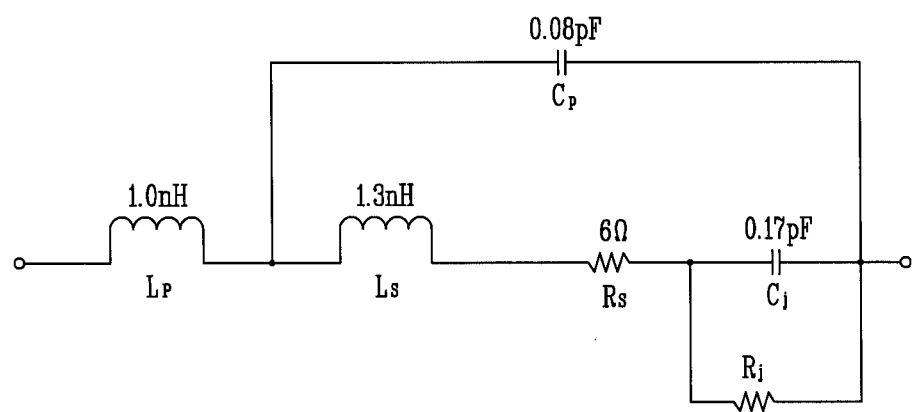
FIG. 4B is a view of a diode equivalent circuit for the circuit of FIG. 4A.

FIG. 4A is a configuration view of a rectifying circuit in accordance with one embodiment disclosed herein, and FIG. 4B is a view of a diode equivalent circuit for the circuit of FIG. 4A.

A rectifying circuit 300 illustrated in FIG. 4A is an X-band rectifying circuit. A rectifier designed according to one embodiment disclosed herein is compact because a single X-band rectenna is used for a large rectenna array application with a device spacing of 0.8λ. For this application, a feeding network of the antenna and the rectifier are designed using a microstrip line structure.

The rectifier (for example, a half-wave rectifier) may include a harmonic rejecting unit 310, a matching unit 320, a rectifying diode 323, a DC-patch unit 330 and a DC return unit.

Here, the diode 323 is one of the most critical components for obtaining high RF-DC conversion efficiency ($\eta_{RF-DC}$) in the rectifying circuit 300. Here, the RF-DC conversion efficiency ($\eta_{RF-DC}$) of the rectifying circuit 300 may be defined as the following Formula 1.

$$\eta_{RF-DC} = \frac{P_{DC}}{P_{RF}} = \frac{V_{DC}^2/R_L}{P_{RF}} \quad \text{[Formula 1]}$$

Here, $P_{DC}$, $P_{RF}$, $V_{DC}$ and $R_L$ denote converted DC power, received RF power, converted DC voltage and load impedance, respectively.

The rectifying diode 323 of the rectenna as illustrated in FIG. 4A, as aforementioned, is the most important component in the design of the rectifying circuit 300. Therefore, the rectenna antenna according to the present invention is preferably set by several conditions to be explained later.

Conditions for the diode according to the present invention include a high breakdown voltage $V_{br}$ which is related to efficiency of high input power, a low forward voltage $V_f$ which is related to capability of detecting (capturing) small signals, low series resistance $R_s$ which is related to overall efficiency of the rectifier, and low junction capacitance $C_j$ which is related to an operation bandwidth.

The diode disclosed herein may preferably be a packaged Schottky barrier diode of type HSMS-8101 from Avago Technologies, for example. Since the diode optimally operates over a frequency range from 10 GHz to 14 GHz, it is suitable for use at 9.5 GHz.

Referring to FIG. 4B which shows a diode equivalent circuit for the circuit of FIG. 4A, the series resistance voltage $R_s$ is 6 ($R_s$=6), the junction capacitance $C_j$ is 0.17 pF ($C_j$=0.17 pF), the forward voltage $V_f$ is in the range of 0.25 to 0.35 V, and the breakdown voltage $V_{br}$ is greater than −4V ($V_{br}$<−4V). The junction capacitance $C_j$ is variable according to operating conditions.

Under these conditions, if it is assumed that a 9.5 GHz operating frequency, 10 mW input power and 100Ω load are provided, upon having 50Ω source impedance, a calculated input impedance of the diode using a circuit simulation is (22−j20) Ω. The impedance difference between the antenna and the diode causes a reduction of power transfer and diode efficiency. Therefore, in order to maximize the RF power transfer from the antenna to the diode, the impedance matching circuit 320 may be designed as illustrated in FIG. 4A.

That is, because the input impedance of the diode changes according to the operating frequency, the RF input power and the load resistance, the matching circuit 320, as illustrated in FIG. 4A, is preferably designed using two radial stubs for wideband operations.

Here, the radial stubs for impedance matching between the antenna and the diode 323 preferably have an angle of circumference of 70°.

In general, non-linearity of the diode generates higher-order harmonics, which causes the reduction of RF-DC conversion efficiency. Thus, the harmonic rejecting filter 310 and the DC-pass filter 330 are necessary to suppress the higher-order harmonics.

Figure 5A:
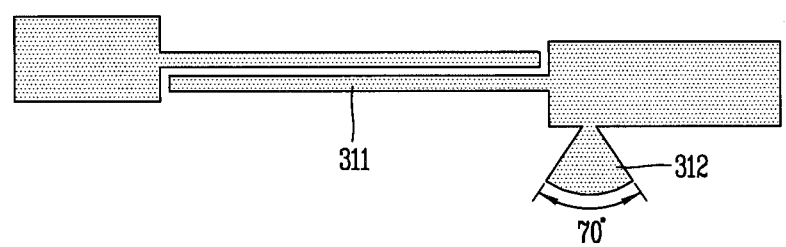
FIG. 5A is a view illustrating a layout of an input harmonic rejecting filter in accordance with one embodiment disclosed herein.
Figure 5B:
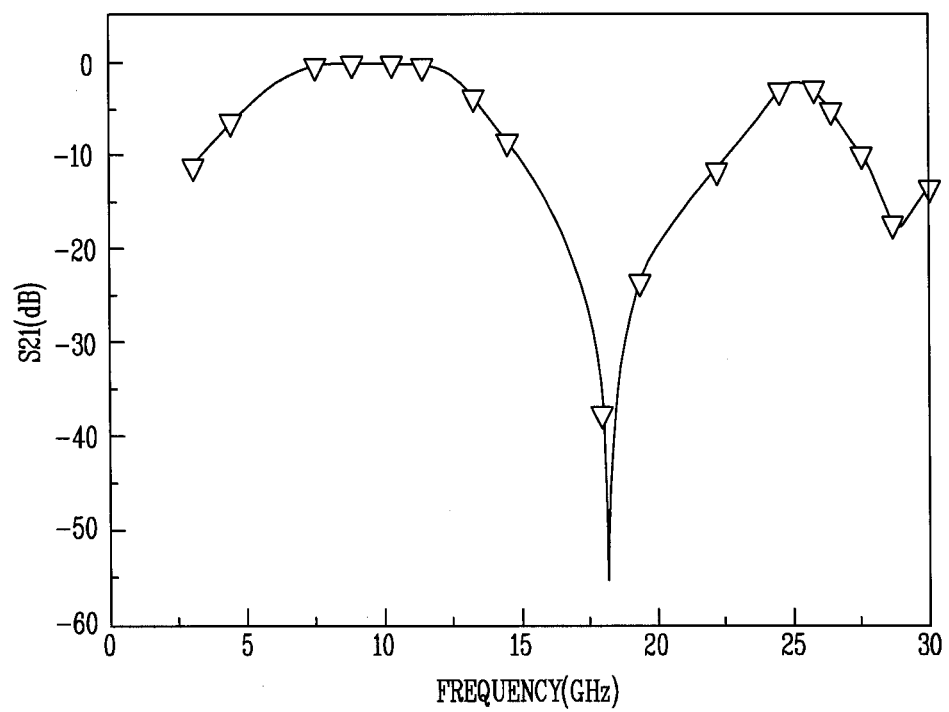
FIG. 5B is a graph showing a transmission coefficient characteristic.

FIG. 5A is a view illustrating a layout of an input harmonic rejecting filter in accordance with one embodiment disclosed herein, and FIG. 5B is a graph showing transmission coefficient $S_{21}$ characteristics of the input harmonic rejecting filter.

The harmonic rejecting filter 310 illustrated in FIG. 5A may include coupled microstrip lines 311 and a radial stub 312.

The harmonic rejecting filter 310 prevents re-radiation of RF harmonics from the diode 323 and blocks unwanted noise signals received from the antenna.

The transmission coefficient $S_{21}$ may be analyzed using a simulator (for example, an advanced design system (ADS) momentum simulator). The coupled microstrip band-pass filter 311 of the harmonic rejecting filter 310 are centered at 9.5 GHz operating frequency with −3 dB, and has 7.3 GHz bandwidth.

In other words, the harmonic rejecting filter which includes an open-circuited radial stub 312 operating as a band-stop filter and the band-pass filter 311, as illustrated in FIG. 5B, attenuates a first harmonic frequency near 19 GHz and a second harmonic frequency near 28.5 GHz, so as to lower the transmission coefficients $S_{21}$ to −26.6 dB and −16.5 dB, respectively.

Here, the radial stub 312 for rejecting the harmonics of the RF signals, as illustrated in FIG. 5A, preferably has an angle of circumference of 70°.

Figure 6A:
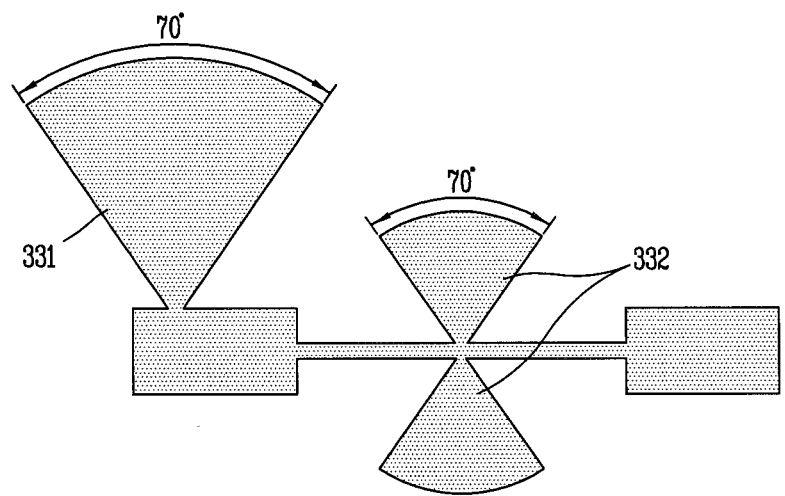
FIG. 6A is view illustrating a layout of a DC-pass filter in accordance with one embodiment disclosed herein.
Figure 6B:
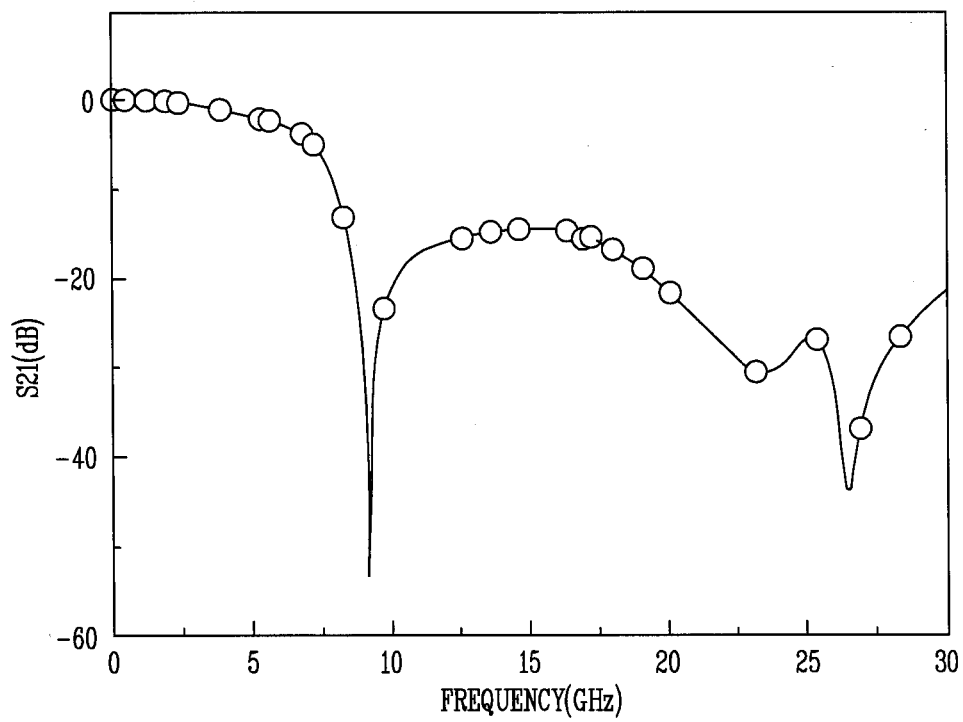
FIG. 6B is a graph showing a transmission coefficient parameter.

FIG. 6A is view illustrating a layout of a DC-pass filter in accordance with one embodiment disclosed herein, and FIG. 6B is a graph showing a transmission coefficient $S_{21}$ characteristic of the DC-pass filter.

The DC-pass filter according to the one embodiment disclosed herein attenuates the RF so as to transfer only DC power to the load. The DC-pass filter may be positioned at an output of the diode 323. The DC-pass filter 330 includes a single radial stub 331 and a pair of radial stubs 332 symmetric to each other, and attenuates the transmission coefficient parameters $S_{21}$ of fundamental, second and third harmonics to be lower than 15 dB, namely, down to −26 dB, −18.8 dB and −25.5 dB, respectively.

Here, the single radial stub 331 for DC power transfer or the pair of radial stubs 332 for lowering an RF ripple voltage, as illustrated in FIG. 6A, preferably have an angle of circumference of 70°.

Figure 7:
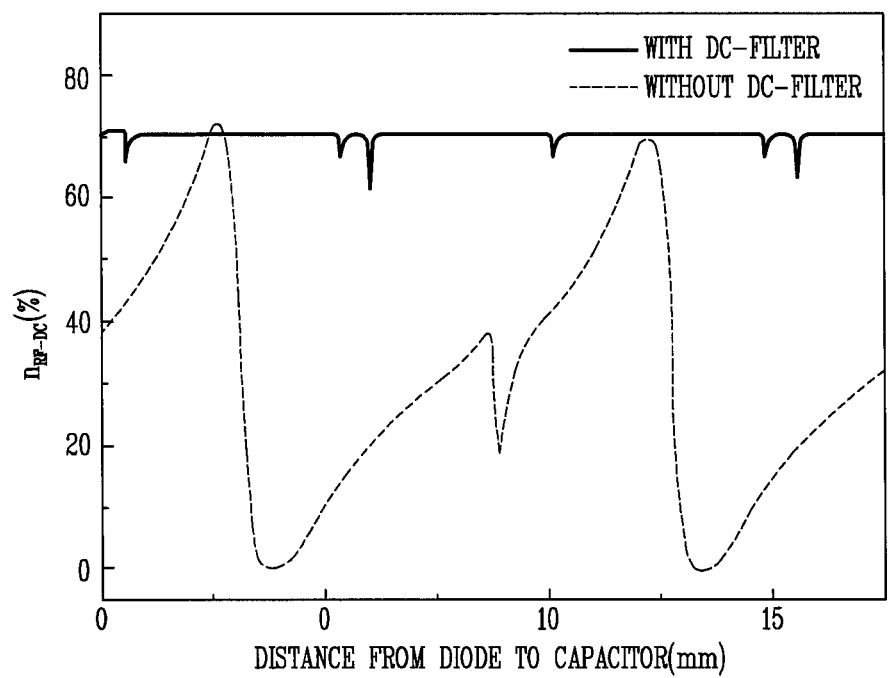
FIG. 7 is a graph showing conversion efficiency of a DC-pass filter according to a distance from a diode to a capacitor.

FIG. 7 is a graph showing conversion efficiency of a DC-pass filter according to a distance from a diode to a capacitor.

Here, a distance from the diode 323 to a capacitor $C_L$ may be indicated with a reference numeral d, as illustrated in FIG. 4A.

In the rectifying circuit 300, a capacitor which is connected in parallel to the load lowers a ripple voltage and supplies DC power stably to the load.

As illustrated in FIG. 7, it can be understood that the DC-pass filter 330 maintains the RF-DC conversion efficiency almost to be a constant with respect to the distance which changes.

On the other hand, in case of an operation without the DC-pass filter 330 disclosed herein, it can be noticed that the RF-DC conversion efficiency is drastically degraded and an optimum length for the maximum RF-DC conversion efficiency is present.

Therefore, the DC-pass filter 330 disclosed herein may be a key component for the stable operation of the rectifying circuit 300.

Figure 8A:
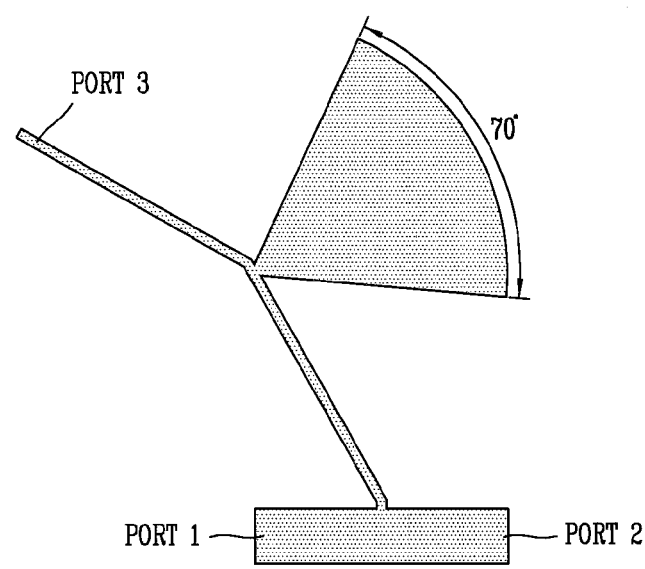
FIG. 8A is a view illustrating a layout of a DC-return circuit in accordance with one embodiment disclosed herein.
Figure 8B:
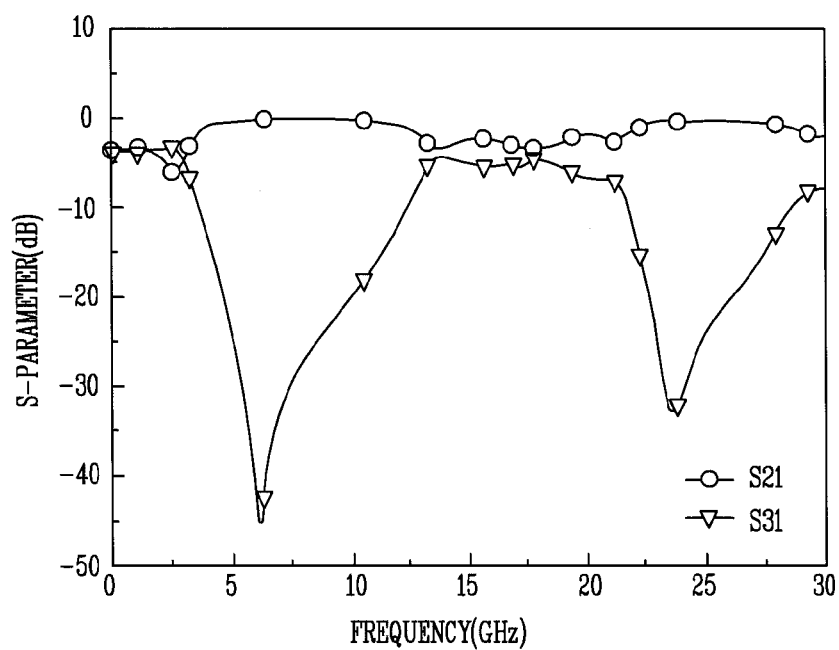
FIG. 8B is a graph showing S-parameter.

FIG. 8A is a view illustrating a layout of a DC-return unit in accordance with one embodiment disclosed herein, and FIG. 8B is a graph showing S-parameter.

The DC return unit 340 is used to prevent re-reflection of harmonics generated by the diode 323 when a reverse current flows into the diode 323. The DC return unit 340 may reject a countercurrent from the ground (port 3 of FIG. 8A) back to the rectifying circuit and prevent RF re-reflection to the antenna.

The DC return unit 340 may function as a band-stop filter to block an X-band transmission between the ground (port 3) and ports 1 and 2.

On the other hand, the RF transmission from the port 1 to the port 2 at the frequency ranging from 3.2 to 13.5 GHz (3 dB band-pass region) is not affected by the ground.

Here, as illustrated in FIG. 8A, the DC return unit 340 may further include a radial stub between the ground (port 3) and the ports 1 and 2. To lower an RF ripple voltage and supply DC power stably to the load, the radial stub preferably has an angle of circumference of 70°.

Figure 9A:
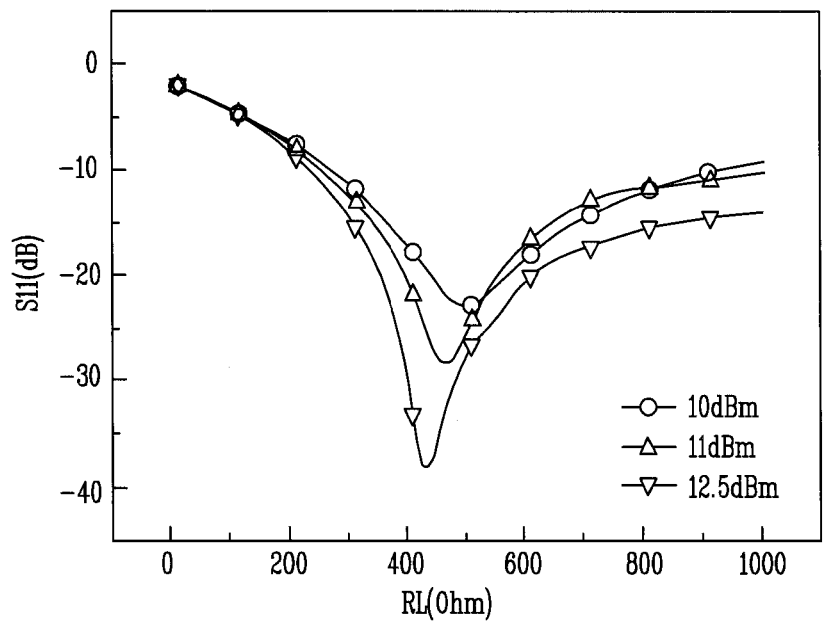
FIG. 9A is a graph showing simulated reflection coefficients of a rectifying circuit disclosed herein according to different input power.
Figure 9B:
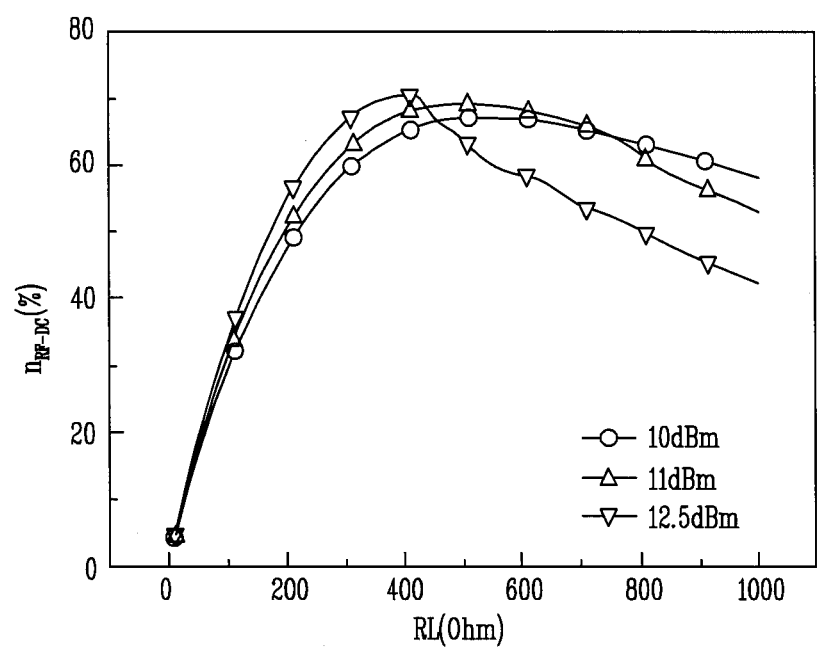
FIG. 9B is a graph showing simulated conversion efficiencies of the rectifying circuit disclosed herein according to different input power.

FIG. 9A is a graph showing simulated reflection coefficients of a rectifying circuit disclosed herein according to different input power, and FIG. 9B is a graph showing simulated conversion efficiencies of the rectifying circuit disclosed herein according to different input power.

FIGS. 9A and 9B show calculated $S_{11}$ and RF-DC conversion efficiency for the estimation of the rectifying circuit performance under various operation conditions.

The RF-DC conversion efficiency ($\eta_{RF\text{-}DC}$) was calculated according to Formula 1, as aforementioned, with respect to load resistance of 50Ω to 1000Ω and input power of 10 dBm, 11 dBm and 12.5 dBm.

Since the input impedance of the diode changes according to the operation conditions, as illustrated in FIGS. 9A and 9B, the rectifying circuit has been optimized with respect to the load resistance according to the input power at 9.5 GHz. When the input power is 12.5 dBm and the load resistance is 400Ω, the maximum efficiency and voltage are 71% and 2.25 V, respectively.

Because the impedances of the diode and each of the components of the rectifying circuit vary according to changes of the operation conditions, it is difficult to design the rectifying circuit for wideband operation. To overcome the difficulty in the present invention, the components of the rectifying circuit were designed using radial stubs to allow for operations over wideband frequencies.

Figure 10A:
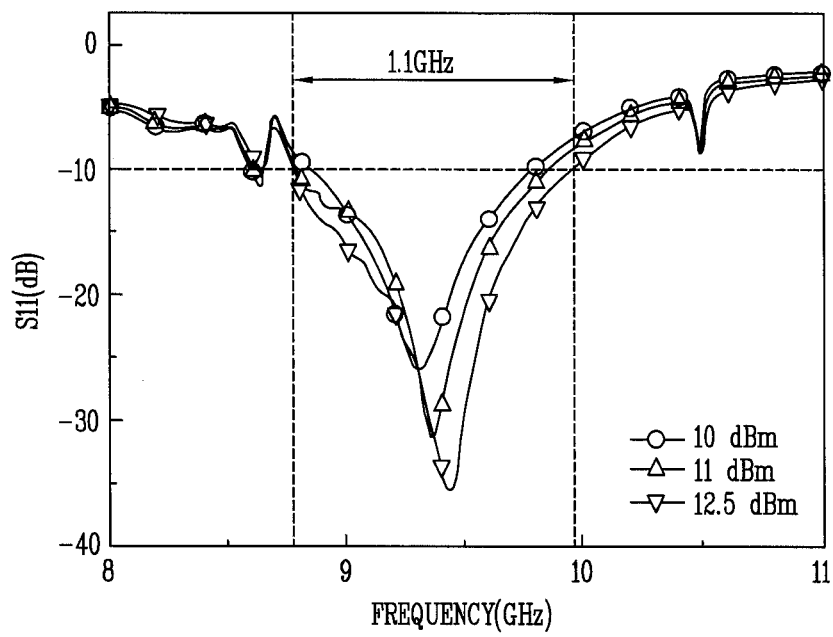
FIG. 10A is a view illustrating a simulated value of a reflection coefficient according to different input power.
Figure 10B:
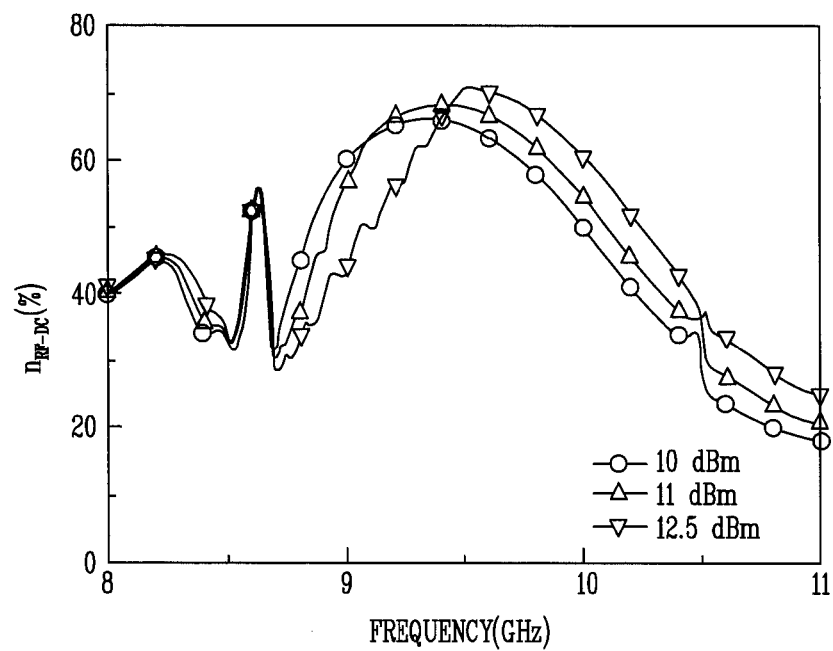
FIG. 10B is a graph showing a simulated RF-DC conversion efficiency.

FIGS. 10A and 10B are graphs showing simulation results for $S_{11}$ and RF-DC conversion efficiency according to a frequency and different input power.

According to the simulation results illustrated in FIG. 10A, it can be understood that the reflection coefficient $S_{11}$ is lower than −10 dB in a frequency range from 8.8 to 9.9 GHz. Also, it can be checked in FIG. 10B that the RF-DC conversion efficiency is higher than 50% in a frequency range from 9.1 to 10.2 GHz with respect to input power of 12.5 dBm.

Figure 11A:
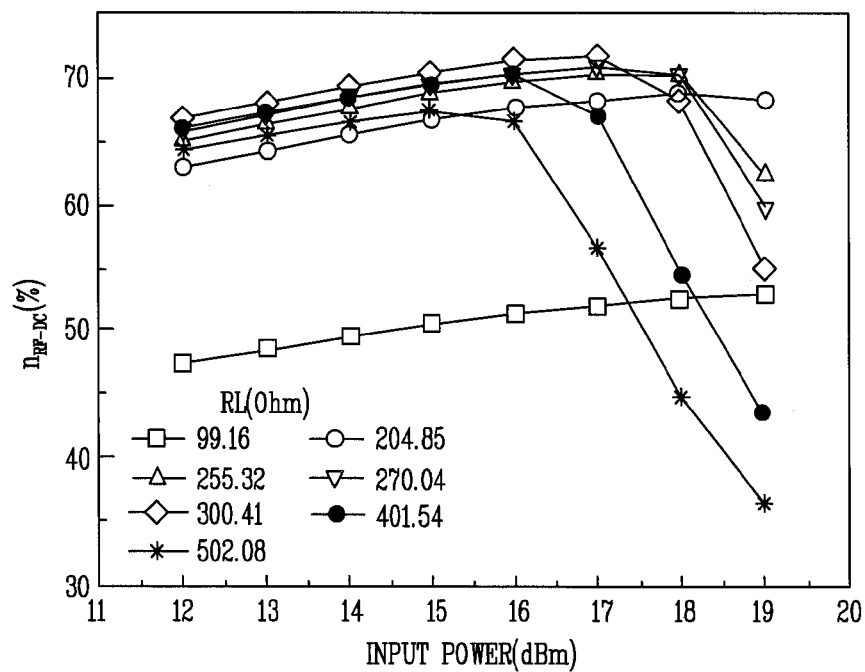
FIG. 11A is a graph showing RF-DC conversion efficiency with respect to actually-measured input power in accordance with one embodiment of the present invention according to different loads.
Figure 11B:
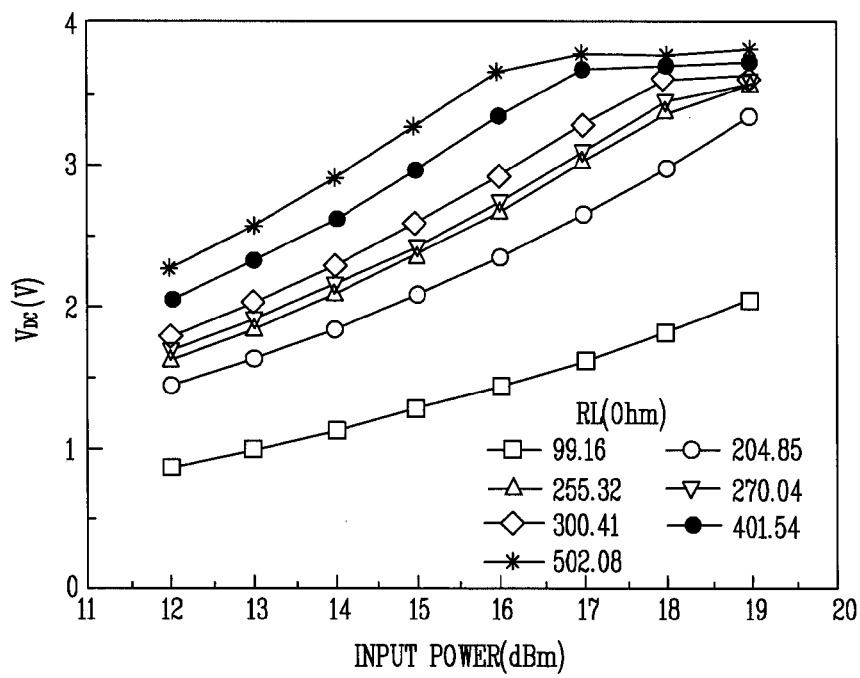
FIG. 11B is a graph showing a converted voltage according to input power.

FIGS. 11A and 11B are graphs showing RF-DC conversion efficiency and a converted voltage with respect to actually-measured input power according to different loads.

It can be understood that the overall tendency of the measured RF-DC conversion efficiency with respect to the input power illustrated in FIG. 11A is similar to the simulation results. However, an optimal condition for the maximum RF-DC conversion efficiency is slightly different. The simulated maximum RF-DC conversion efficiency is 71% with respect to 12.5 dBm under the load of 40Ω, but the measured maximum RF-DC conversion efficiency is 71.9% with respect to 17 dBm under the load of 300Ω. It is obvious from the measurement results that the diode and the rectifying circuit according to the present invention can be used at higher input power than the simulated value.

Referring to FIG. 11B, it can also be noticed that the converted DC voltage increases as the input power increases and the DC voltage at the maximum efficiency is 3.2 V.

Compared to the conventional conversion circuit which has exhibited 63.2% efficiency at 8.51 GHz or 21% efficiency at 9.3 GHz, it can be noticed that the efficiency of the RF-DC conversion circuit according to the present invention is higher than those of such conventional circuits at the X-band frequency.

Figure 12A:
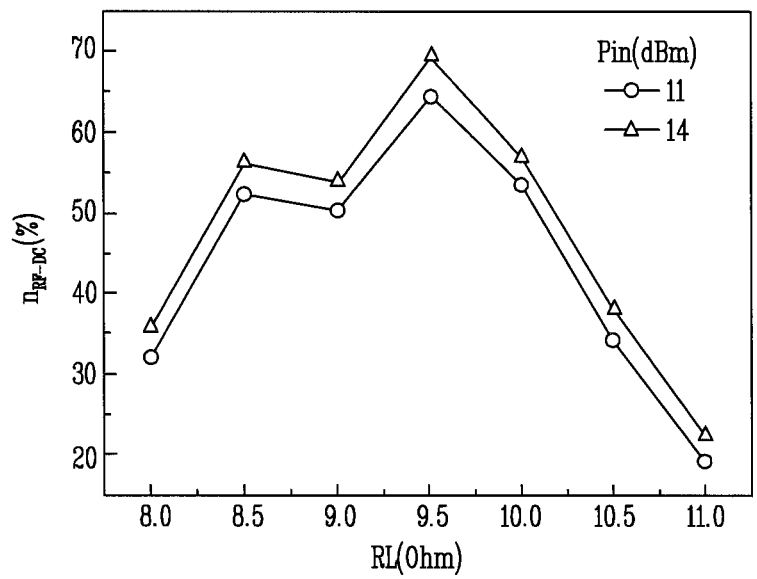
FIG. 12A is a graph showing a measured conversion efficiency in accordance with one embodiment disclosed herein.
Figure 12B:
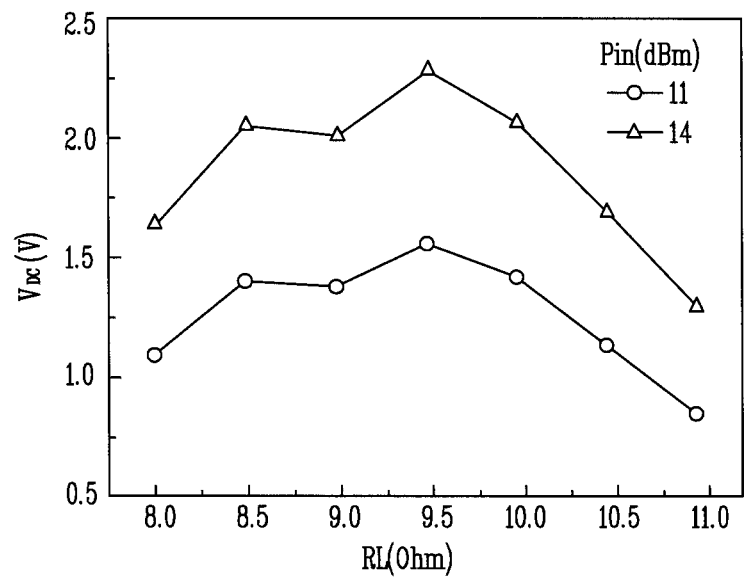
FIG. 12B is a graph showing a converted voltage.

FIGS. 12A and 12B are graphs showing measured conversion efficiency and converted voltage in accordance with one embodiment disclosed herein.

As illustrated in FIG. 12A, it can be seen that the rectifying circuit disclosed herein has the maximum efficiency of 71.9% and keeps having efficiency more than 50% over 1 GHz frequency bandwidth.

The rectifying circuit according to the present invention is optimized compactly with dimensions of 35 mm by 21 mm (35×21) at 9.5 GHz, so as to be applied to a large rectenna array system.

The present invention has been described with reference to the foregoing embodiments, but it can be understood that various modifications and changes can be obtained from the present invention without departing from the scope of the present invention as defined in the appended claims.

What is claimed is:

1. A rectifying apparatus comprising:
   a harmonic rejecting filter having coupled microstrip lines and a first radial stub connected to one of the coupled microstrip lines at a first point, wherein the harmonic rejecting filter is configured to prevent re-radiation of radio frequency (RF) harmonics;
   a matching circuit located at an output of the harmonic rejecting filter and configured to perform impedance matching between an antenna and a rectifying diode, the matching circuit having a second radial stub connected to said one of the coupled microstrip lines at a second point;
   the rectifying diode located at an output of the said one of the coupled microstrip lines;
   a direct current (DC)-pass filter having a third radial stub and configured to attenuate RF output by the rectifying diode to transfer DC power; and
   a DC return filter having a fourth radial stub and configured to lower a ripple voltage from a signal output by the DC-pass filter so as to supply the DC power stably to a load
   wherein the fourth radial stub is connected to said one of the coupled microstrip lines at a location between the first point and the second point.

2. The apparatus of claim 1, wherein the coupled microstrip lines each operates as a band-pass filter.

3. The apparatus of claim 1, wherein the first radial stub is an open-circuited radial stub and operates as a band-stop filter.

4. The apparatus of claim 1, wherein the second radial stub comprises two radial stubs symmetric to each other.

5. The apparatus of claim 1, wherein the third radial stub comprises a single radial stub, and a pair of radial stubs symmetric to each other.

6. The apparatus of claim 1, wherein the fourth radial stub comprises a signal radial stub.

7. The apparatus of claim 1, wherein the harmonic rejecting filter blocks noise signals introduced from the antenna.

8. The apparatus of claim 1, wherein the first radial stub operates as a band-stop filter.

9. The apparatus of claim 1, wherein the first to fourth radial stubs each have an angle of circumference of 70°.

10. The apparatus of claim 1, wherein the rectifying apparatus has an operating frequency near 9.5 GHz.

* * * * *